(12) United States Patent
Lobel

(10) Patent No.: US 8,187,061 B2
(45) Date of Patent: May 29, 2012

(54) BUTCHERING PROCESSES FOR THE BEEF CLOD

(76) Inventor: Stanley Lobel, Purchase, NY (US)

( * ) Notice: Subject to any disclaimer, the term of this patent is extended or adjusted under 35 U.S.C. 154(b) by 224 days.

(21) Appl. No.: 12/465,937

(22) Filed: May 14, 2009

(65) Prior Publication Data

US 2009/0304902 A1 Dec. 10, 2009

Related U.S. Application Data

(60) Provisional application No. 61/059,270, filed on Jun. 5, 2008.

(51) Int. Cl.
*A22C 18/00* (2006.01)
(52) U.S. Cl. ...................................................... 452/157
(58) Field of Classification Search .................. 452/149, 452/156–158, 174, 198
See application file for complete search history.

(56) References Cited

U.S. PATENT DOCUMENTS

| | | | |
|---|---|---|---|
| 1,381,526 A | 6/1921 | Waters | |
| 1,533,648 A * | 4/1925 | Hawkinson | 426/315 |
| 1,604,764 A * | 10/1926 | Block | 426/513 |
| 1,864,284 A * | 6/1932 | Taylor | 426/420 |
| 2,046,118 A * | 6/1936 | Gurney | 426/645 |
| 2,228,414 A * | 1/1941 | Spang | 426/645 |
| 2,242,451 A * | 5/1941 | Carpenter | 426/272 |
| 2,599,328 A * | 6/1952 | Hoenselaar | 426/645 |
| 3,042,532 A * | 7/1962 | Daline | 426/132 |
| 4,313,963 A * | 2/1982 | Greenspan | 426/58 |
| 4,337,275 A * | 6/1982 | Adams | 426/104 |
| 4,574,087 A * | 3/1986 | Sheehy et al. | 426/129 |
| 4,818,556 A * | 4/1989 | Hoashi | 426/615 |
| 5,030,472 A | 7/1991 | Logan, Jr. | 426/641 |
| 5,069,914 A | 12/1991 | Gagliardi, Jr. | 426/76 |
| RE35,374 E | 11/1996 | Logan, Jr. | 426/641 |
| 5,631,035 A | 5/1997 | Clarke et al. | 426/281 |
| 5,690,989 A | 11/1997 | Clarke et al. | 426/641 |
| 5,951,392 A | 9/1999 | Gagliardi | 452/125 |
| 6,234,073 B1 | 5/2001 | Dieso et al. | 99/538 |
| 6,413,073 B2 | 7/2002 | McFarland | 425/382 R |
| 6,484,627 B1 | 11/2002 | Peter | 99/538 |
| 6,929,520 B2 | 8/2005 | Johnson et al. | 452/134 |
| 7,008,313 B2 | 3/2006 | Gagliardi, Jr. | 452/135 |
| 7,065,880 B2 | 6/2006 | Howman et al. | 30/114 |
| 7,070,824 B1 | 7/2006 | Gore | 426/518 |
| 7,150,678 B2 | 12/2006 | Lobel | 452/151 |
| 7,214,403 B1 | 5/2007 | Peters | 426/641 |
| 7,503,839 B2 | 3/2009 | Lobel | 452/157 |
| 2005/0048892 A1 | 3/2005 | Stockman | 452/149 |
| 2006/0240756 A1 | 10/2006 | Lobel | 452/151 |
| 2007/0254580 A1 | 11/2007 | Lobel | 452/157 |
| 2007/0264920 A1 | 11/2007 | Lobel | 452/149 |

FOREIGN PATENT DOCUMENTS

| FR | 2 598 887 | 11/1987 |
|---|---|---|
| KR | 10-2006-0032330 | 4/2006 |

OTHER PUBLICATIONS

The Meat Buyer's Guide. Beef, Lamb, Veal, Pork, and Poultry. North American Meat Processors Association, John Wiley & Sons, Inc. (New Jersey, 2007), pp. cover, copyright page, 1, 4, 5, 17-23, 27, 58, and 59.
Steven J. Jones et al., Bovine Myology & Muscle Profiling. Cattlemen's Beef Board and National Cattlemen's Beef Association (Colorado, 2005), pp. cover, 1-33, back cover.
Bovine Myology & Muscle Profiling web pages, University of Nebraska, Lincoln, http://bovine.unl.edu/bovine3D/eng/ (1 page of home page; 8 pages entitled Similar to Item No. 116A Beef Chuck, Chuck Roll; 2 pages entitled "Item No. 116D Beef Chuck, Chuck Eye Roll"; 3 pages entitled "Similar to Item No. 114 Beef Chuck, Shoulder Clod"; 3 pages entitled "Item No. 114E Beef Chuck, Shoulder Clod, Arm Roast").
Beef Innovations Group news, http://www.beefinnovationsgroup.com/News.aspx with articles from Apr. 3, 2006 to Jul. 26, 2006 (seven pages total) including "Beef Innovations Group: New Name, New Product Powerhouse" (Jul. 26, 2006), "National Cattlemen's Beef Association Brings Knowledge and Expertise to the Market Through the Beef Innovations Group" (Jul. 3, 2006), "What's Next for Beef Value Cuts" (Jun. 30, 2006), "Shredded Beef Holds the Key to Profit Potential" (May 1, 2006), and "New Products Coming Alive in Retail Markets" (Apr. 3, 2006).
Beef Value Cuts. Cutting Instructions for Top Blade (Flat Iron) Steaks. Cattlemen's Beef Board, 2003 (6 pages).
Beef Value Cuts. Cutting Instructions for Shoulder Center Steaks and Shoulder Tender Roasts and Medallions, Cattlemen's Beef Board, 2003 (6 pages).
Delmonico Steak. Cutting Guide. Cattlemen's Beef Board, 2008 (1 page).
Delmonico Steak. Cattlemen's Beef Board, 2008 (1 page).
Delmonico Steak. Cattlemen's Beef Board and National Cattlemen's Beef Association, 2008 (1 page).
The Sierra Cut. Cutting Guide. Cattlemen's Beef Board, 2008 (1 page).
The Sierra Cut. Cattlemen's Beef Board, 2008 (1 page).
Denver Cut, Siena Cut, Delmonico Steak, Boneless Country-Style Beef Chuck Ribs, America's Beef Roast. Cattlemen's Beef Board and National Cattlemen's Beef Association, 2008 (5 pages).
The Denver Cut. Cattlemen's Beef Board, 2008 (4 pages).
The Denver Cut. Cattlemen's Beef Board, 2008 (1 page).

* cited by examiner

*Primary Examiner* — Richard Price, Jr.
(74) *Attorney, Agent, or Firm* — Steptoe & Johnson LLP

(57) ABSTRACT

A method for mass-production butchering of a chuck roll of beef includes: sectioning the beef clod into a first portion and a second portion substantially along a natural seam, the first portion comprising triceps brachii long head muscle and essentially being free of triceps brachii lateral head muscle, and the second portion comprising triceps brachii lateral head muscle and essentially being free of triceps brachii long head muscle; and sectioning the first portion generally with or parallel to the grain into a first set of separate portions. Another method for mass-production butchering of a beef clod may include: sectioning the beef clod into a first portion and a second portion substantially along a natural seam, the first portion comprising the teres major; and sectioning the first portion generally with or parallel to the grain into a first set of separate portions.

28 Claims, No Drawings

BUTCHERING PROCESSES FOR THE BEEF CLOD

CROSS-REFERENCE TO RELATED APPLICATION

The benefits of Provisional Application No. 61/059,270 filed Jun. 5, 2008 and entitled "Butchering Processes for the Beef Clod" are claimed under 35 U.S.C. §119(e), and the entire contents of this provisional application are expressly incorporated herein by reference thereto.

FIELD OF THE INVENTION

The invention relates to a butchering process for meat products. More particularly, the invention relates to a butchering process for the shoulder/clod portion of a beef carcass.

BACKGROUND OF THE INVENTION

In the United States, the organized grading of cattle and beef has become particularly important in the promotion and marketing of quality products. Administered by the United States Department of Agriculture, the grading system is used to assign a distinct level of quality to cattle carcasses.

Carcass beef grades include a "yield grade" and a "quality grade." The yield grade, denoted by the numbers 1 through 5, generally refers to the degree of cutability of the carcass and serves as an indicator of the amount of closely trimmed (½ inch fat or less), boneless retail cuts expected to be derived from the major wholesale cuts of the carcass. "Yield Grade 1" represents the highest degree of cutability. The quality grade, on the other hand, separately indicates the palatability of the lean. Carcasses of steers and heifers may be graded as Prime, Choice, Select, Standard, Commercial, Utility, Cutter, and Canner, in descending order of quality; carcasses of cows may receive any of these grades except Prime. Bullock carcasses may be graded as Prime, Choice, Select, Standard, and Utility. Steers are considered male bovines castrated when young and which have not begun to develop the secondary physical characteristics of bulls, while heifers are considered young, such as less than 3 year old immature female bovines that have not developed the physical characteristics typical of cows, e.g., have not borne a calf. Cows are considered female bovines that have developed through reproduction or with age, the physical characteristics typical of mature females, and bullocks are considered young, such as under approximately 24 months of age, male bovines that have developed or begun to develop the secondary physical characteristics of bulls.

The highest quality grade, USDA Prime, is reserved for beef with abundant marbling (defined as flecks of fat within the lean muscle), thus providing a juicy and flavorful meat that also is tender. USDA Prime, for example, may have more than 8% intramuscular fat. Only a small percent of all graded carcass beef qualifies as USDA Prime. As would be expected, Prime beef is favored by hotels and restaurants, is a successful commercial export product from the United States, and also is available through retail sales to discriminating consumers. Because it represents the highest quality, beef certified as USDA Prime commands the highest prices in the market.

The carcass typically refers to both sides of the animal, whereas a side refers to half of the carcass including both a frontquarter and a hindquarter. From the standpoint of profitability the hindquarter cuts of the carcass, which represent about half of a side of a beef carcass, traditionally have been greatest in demand. In particular, the hindquarter includes the full loin with the short loin and sirloin, the round, flank, and kidney knob. Thus, the hindquarter is the source of the well known beef cuts including the top loin steak, T-bone steak, porterhouse steak, tenderloin roast or steak (such as chateaubriand or filet mignon), top sirloin steak, sirloin steak, tenderloin roast or steak, beef tri-tip, round steak, top round roast or steak, and rump roasts.

The frontquarter, which represents the other half of a side of a beef carcass, includes the chuck, rib, plate, brisket and shank. Products typically produced from the frontquarter include cuts such as the rib roast or steak, rib eye roast or steak, back ribs, skirt steak, and whole brisket. The beef chuck, shoulder/clod, although used for such cuts as a "Flat Iron," "Petite Tender," and "Shoulder Center," is not considered to be among the wholesale cuts that is most profitable and in demand. Beef from the beef chuck typically is transformed into lower cost ground beef chuck for example for use in producing ground beef chuck patties.

Once a carcass has been graded as Prime, each of the cuts from the carcass retain that designation. Thus, cuts from both the frontquarter and hindquarter are graded Prime, including the less profitable Prime chuck. There exists a need to make use of the chuck to produce steaks instead of simply being used as roasts or being ground into ground beef chuck. Moreover, there exists a need to make use of the Prime chuck to produce Prime steaks instead of simply being ground into Prime ground beef chuck. Because of the demand for the more costly cuts of Prime beef—which for example restaurants and hotels prefer to offer to customers—the ability to make use of Prime chuck for steaks may lead to enhanced profitability derived from this portion of the carcass. There has been substantial industry interest in enhancing the value of the frontquarter. For example, scientists from the University of Nebraska and the University of Florida even conducted a study for the Cattlemen's Beef Board and analyzed more than 5,500 muscles of the beef chuck and round to assist in developing new beef products. Commercialization of the "Flat Iron" steak, a shoulder top blade steak cut from the chuck, is said to have resulted from the study. Nevertheless, the chuck is complex because of the number of muscles and associated fibers that do not run in the same direction as each other. Thus, despite the efforts to date as described above, there remains a need for additional methods of producing products from the beef chuck, shoulder/clod.

The "fabrication" of the beef carcasses is conducted in mass-production operations by beef packers, who harvest finished cattle purchased from feedlots and create primal, subprimal, and sometimes consumer-ready cuts. The beef then is distributed to purveyors/processors or retailers for further sale. Thus, there is a need for additional methods of producing products from the beef chuck, shoulder/clod for use in the mass-production operations.

SUMMARY OF THE INVENTION

The invention relates to a method for mass-production butchering of a beef clod including: sectioning the beef clod into a first portion and a second portion substantially along a natural seam, the first portion comprising triceps brachii long head muscle and essentially being free of triceps brachii lateral head muscle, and the second portion comprising triceps brachii lateral head muscle and essentially being free of triceps brachii long head muscle; and sectioning the first portion generally with or parallel to the grain into a first set of separate portions. The method may further include sectioning the second portion generally with or parallel to the grain into a second set of separate portions. In addition, the method may further include removing from at least one of the first and second portions excess material selected from the group consisting of fat, sinue, and connective tissue to expose a lean side thereof.

In addition, in some exemplary the method may further include mechanically tenderizing separate portions of the first set, wherein the separate portions of the first set are mechanically tenderized by needling on at least one side thereof or wherein the separate portions of the first set are mechanically tenderized by needling on both sides thereof. In some embodiments, the method may further include mechanically tenderizing separate portions of the second set, wherein the separate portions of the second set are mechanically tenderized by needling on at least one side thereof or wherein the separate portions of the second set are mechanically tenderized by needling on both sides thereof.

Moreover, in some exemplary embodiments, the method may further include releasably forming separate portions of the first set into a substantially arcuate shape, wherein the arcuate shape is maintained by twine and/or by pins. Also, the method may further include releasably forming separate portions of the second set into a substantially arcuate shape, wherein the arcuate shape is maintained by twine and/or by pins.

In some exemplary embodiments, the method further includes wrapping separate portions of the first set and/or separate portions of the second set in an outer layer selected from the group consisting of fat, bacon, and prosciutto.

The natural seam may include fat in some embodiments.

In some exemplary embodiments, the method further includes removing a vein between the first and second portions.

Moreover, in some exemplary embodiments, the method may further include coupling the first set of separate portions with edible glue.

The invention further relates to a roast formed by the aforementioned method for mass-production butchering of a beef clod.

The invention further relates to a london broil formed by the aforementioned method for mass-production butchering of a beef clod.

In addition, the invention relates to a method for mass-production butchering of a beef clod including: sectioning the beef clod into a first portion and a second portion substantially along a natural seam, the first portion comprising the teres major; and sectioning the first portion generally with or parallel to the grain into a first set of separate portions. The invention further relates to a roast formed by this method. The invention further relates to a london broil formed by this method.

DETAILED DESCRIPTION OF THE PREFERRED EMBODIMENTS

Typically, meat is cut against the grain, i.e., the muscle fibers of the meat, to provide a softer consistency and better eating experience. Otherwise, typically, if meat is cut parallel to the grain, it will have a stringy and fibrous consistency even if it is properly cooked. For example, typically a brisket that has been cut against the grain has a soft consistency while a brisket cut generally with or parallel to the grain has a chewy consistency. Nonetheless, the methods disclosed herein advantageously cut meat generally with or parallel to the grain to achieve a desirable, soft consistency.

The chuck is generally the shoulder region of the animal, and includes part of the neck and backbone, the first five ribs (U.S. packer/processors typically make the chuck/rib break between the 5th and 6th ribs), as well as portions of the shoulder blade and upper arm. It can weigh over 100 lbs.

Among the cuts derived from the chuck is the beef chuck, shoulder/clod which typically weighs between 13 and 21 lbs. An item #114 beef chuck, shoulder/clod (The Meat Buyer's Guide: Beef, Lamb, Veal, Pork, and Poultry. North American Meat Processors Association; John Wiley & Sons, Inc., New Jersey, 2007), for example, is a boneless piece of meat formed of a muscle system disposed anterior to the 6th rib. Among the muscles included in the clod are (1) latissimus dorsi, infraspinatus, triceps brachii long head, triceps brachii lateral head, tensor fasciae antibrachii and optionally (2) the trapezium, cutaneous trunci, teres major, and minor muscles over the humerus. Various cuts of meat from the #114 include the "Flat Iron" (infraspinatus), "Petite Tender" (teres major), and "Shoulder Center" (triceps brachii long head).

In accordance with a first exemplary method, mass production butchering will now be described for the item #114 beef chuck, shoulder/clod described above making use of an item #114E beef chuck, shoulder/clod, arm roast (The Meat Buyer's Guide: Beef, Lamb, Veal, Pork, and Poultry. North American Meat Processors Association; John Wiley & Sons, Inc., New Jersey, 2007). Item #114E is a portion of an item #114 beef chuck, shoulder/clod and includes (1) the triceps brachii long head and triceps brachii lateral head and optionally may include (2) muscles including the triceps brachii medial head and tensor fascia antibrachii. A variant of item #114E, known as Item #114E PSO: 1 and sometimes referred to as the "Clod Heart," includes only the triceps brachii long head and a portion of the triceps brachii lateral head muscles. Item #114E may be sectioned along a natural seam so that the triceps brachii long head and triceps brachii lateral head are separated from one another in different portions. Item #1114E beef shoulder, arm steaks may be formed by cutting the separated triceps brachii long head from item #114E across the grain. However, in accordance with the method disclosed herein, preferably the separated triceps brachii long head from item #114E instead is cut generally with or parallel to the grain to create a plurality of individual portions. Moreover, the separated triceps brachii lateral head from item #114E also may be cut generally with or parallel to the grain to create a plurality of roasts and/or a plurality of london broils.

In accordance with another exemplary method, mass production butchering will now be described for an item #114 beef chuck, shoulder/clod making use of a #114F beef chuck, shoulder tender (The Meat Buyer's Guide: Beef, Lamb, Veal, Pork, and Poultry. North American Meat Processors Association; John Wiley & Sons, Inc., New Jersey, 2007). Preferably, an item #114F beef chuck, shoulder tender is prepared from item #114 by cutting item #114 along a natural seam to separate the teres major muscle. Note that a #114F PSO: 1 may be prepared by trimming the item #114F to be peeled/denuded, surface membrane removed (90% lean exposed) with a maximum average thickness of surface fat of 0.125 inch (3 mm). Further, note that an item #1114F beef shoulder tender, portioned, is in the form of individual steaks prepared by cutting an item #114F across the grain. However, in accordance with the method disclosed herein, item #114F instead is cut generally with or parallel to the grain to create a plurality of roasts and/or a plurality of london broils.

In each of the above-mentioned embodiments, the natural seam may be a seam of fat therebetween that may be intermuscular fat or intramuscular fat. Moreover, fat, sinue, and connective tissue, may be trimmed to expose the lean and produce a denuded muscle or muscle system. The muscle or muscle system may be cut into separate portions which preferably are suitably sized for roasts and/or london broils. In an exemplary embodiment, the portions formed in the above-mentioned embodiments may be cut from the triceps brachii long head, generally with or parallel to the grain as specified above, each suitably sized as a roast or london broil.

In each of the above-mentioned embodiments, the method may include removing a vein between the first and second portions and/or coupling separate portions with edible glue.

In one exemplary embodiment, portions may be cut from the triceps brachii long head (e.g., two portions), or teres major, to be used as a pot roast or for other purposes.

After or before the portions are cut in the exemplary embodiments described herein, optionally the portions are needled. In particular, jaccarding (also known as needling and blade tenderizing) is known as a technique for piercing meat for tenderizing. A double jaccarding machine, for example, needles a piece of meat on both sides thereof. In an exemplary embodiment, the portions cut from the triceps brachii long head or teres major are individually needled on each side thereof after the portions are cut. While the needle marks may be visible in meat in the raw state, advantageously the marks are not necessarily visible in the meat once cooked.

In some embodiments, raw portions produced for example from the triceps brachii long head or teres major may be tied with butcher's twine for shaping and compacting, which also provides an attractive presentation to the cuts. The tying, for example, may permit such a raw portion to have a generally circular or otherwise arcuate shape such as an oblong shape. Alternatively, such a shape may be achieved by clamping the raw meat using pins. Also, in some embodiments, such raw meat may be wrapped in fat, bacon, or prosciutto.

Moreover, in some embodiments, some portions may be ground to produce ground beef.

In some embodiments, the portions may be thinly sliced into pieces with a thickness between about 2 mm and about 4 mm. Such thin slices are known as "shabu-shabu" (which then may be cooked for example in hot water or broth). In one exemplary embodiment, the triceps brachii long head or teres major is chilled to facilitate slicing, and then thinly sliced instead of being cut entirely into portions with substantially greater thickness.

The beef chuck, shoulder/clod and portions cut therefrom according to an exemplary embodiment may be injected with salt(s) such as sodium chloride, calcium chloride, and/or sodium phosphate in solution (i.e., in a saline solution) and/or other enhancers for enhanced moisture and enhanced flavor. In some exemplary embodiments, the beef chuck, shoulder/clod and portions cut therefrom may be pounded.

In some exemplary embodiments, the beef chuck, shoulder/clod and portions cut therefrom may be marinated.

It should be emphasized that although the sectioning of an item #114 beef chuck, shoulder/clod has been described above, other forms of a beef chuck derived from the shoulder/clod may be used.

Moreover, the beef chuck, shoulder/clod and portions cut therefrom may be aged before being cut or after being cut as applicable.

Large beef portions such as roasts and london broils are contemplated. In some exemplary embodiments, minute steaks, sandwich steaks, fry steaks, and steak on a bun also ultimately may be derived from the methods herein.

While various descriptions of the embodiments are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the embodiments disclosed herein are to be included as further embodiments. The scope of the methods and products is accordingly defined as set forth in the appended claims.

What is claimed is:

1. A method for mass-production butchering of a beef clod comprising:
   sectioning the beef clod into a first portion and a second portion substantially along a natural seam, the first portion comprising triceps brachii long head muscle and essentially being free of triceps brachii lateral head muscle, and the second portion comprising triceps brachii lateral head muscle and essentially being free of triceps brachii long head muscle; and
   sectioning the first portion generally with or parallel to the grain into a first set of separate portions.

2. The method of claim 1, further comprising:
   sectioning the second portion generally with or parallel to the grain into a second set of separate portions.

3. The method of claim 2, further comprising:
   mechanically tenderizing separate portions of the second set.

4. The method of claim 3, wherein the separate portions of the second set are mechanically tenderized by needling on at least one side thereof.

5. The method of claim 3, wherein the separate portions of the second set are mechanically tenderized by needling on both sides thereof.

6. The method of claim 2, further comprising:
   releasably forming separate portions of the second set into a substantially arcuate shape.

7. The method of claim 6, wherein the arcuate shape is maintained by twine.

8. The method of claim 6, wherein the arcuate shape is maintained by pins.

9. The method of claim 2, further comprising:
   wrapping separate portions of the second set in an outer layer selected from the group consisting of fat, bacon, and prosciutto.

10. The method of claim 2, wherein the second set of separate portions includes at least one separate portion with a thickness between about 2 mm and about 4 mm.

11. The method of claim 1, further comprising:
    removing from at least one of the first and second portions excess material selected from the group consisting of fat, sinue, and connective tissue to expose a lean side thereof.

12. The method of claim 1, further comprising:
    mechanically tenderizing separate portions of the first set.

13. The method of claim 12, wherein the separate portions of the first set are mechanically tenderized by needling on at least one side thereof.

14. The method of claim 12, wherein the separate portions of the first set are mechanically tenderized by needling on both sides thereof.

15. The method of claim 1, further comprising:
    releasably forming separate portions of the first set into a substantially arcuate shape.

16. The method of claim 15, wherein the arcuate shape is maintained by twine.

17. The method of claim 15, wherein the arcuate shape is maintained by pins.

18. The method of claim 1, further comprising:
wrapping separate portions of the first set in an outer layer selected from the group consisting of fat, bacon, and prosciutto.

19. The method of claim 1, wherein the first set of separate portions includes at least one separate portion with a thickness between about 2 mm and about 4 mm.

20. The method of claim 1, wherein the natural seam comprises fat.

21. The method of claim 1, further comprising:
removing a vein between the first and second portions.

22. The method of claim 1, further comprising:
coupling the first set of separate portions with edible glue.

23. A roast formed by the method of claim 1.

24. A london broil formed by the method of claim 1.

25. A method for mass-production butchering of a beef clod comprising:
sectioning the beef clod into a first portion and a second portion substantially along a natural seam, the first portion comprising the teres major; and
sectioning the first portion generally with or parallel to the grain into a first set of separate portions.

26. A roast formed by the method of claim 25.

27. A london broil formed by the method of claim 25.

28. The method of claim 25, wherein the first set of separate portions includes at least one separate portion with a thickness between about 2 mm and about 4 mm.

* * * * *